US010235521B2

(12) United States Patent
Zhang et al.

(10) Patent No.: US 10,235,521 B2
(45) Date of Patent: *Mar. 19, 2019

(54) MALWARE DETECTION USING CLUSTERING WITH MALWARE SOURCE INFORMATION

(71) Applicant: Palo Alto Networks, Inc., Santa Clara, CA (US)

(72) Inventors: Yanxin Zhang, San Ramon, CA (US); Xinran Wang, San Ramon, CA (US); Huagang Xie, Pleasanton, CA (US); Wei Xu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,500

(22) Filed: Jun. 5, 2017

(65) Prior Publication Data

US 2017/0344742 A1    Nov. 30, 2017

Related U.S. Application Data

(63) Continuation of application No. 13/777,995, filed on Feb. 26, 2013, now Pat. No. 9,710,646.

(51) Int. Cl.
*H04L 29/06* (2006.01)
*G06F 21/56* (2013.01)

(52) U.S. Cl.
CPC ............ *G06F 21/56* (2013.01); *G06F 21/568* (2013.01); *H04L 63/14* (2013.01); *H04L 63/1408* (2013.01); *H04L 63/1441* (2013.01)

(58) Field of Classification Search
CPC . H04L 63/14; H04L 63/1441; H04L 63/1425; H04L 63/145; H04L 63/1408; H04L 63/20; H04L 41/06; G06F 21/56; G06F 21/577; G06F 21/564
See application file for complete search history.

(56) References Cited

U.S. PATENT DOCUMENTS

| 5,452,442 | A  | 9/1995  | Kephart  |
|-----------|----|---------|----------|
| 8,176,556 | B1 | 5/2012  | Farrokh  |
| 8,316,440 | B1 | 11/2012 | Hsieh    |
| 8,321,935 | B1 | 11/2012 | Chen     |
| 8,364,811 | B1 | 1/2013  | Erdmann  |
| 8,370,942 | B1 | 2/2013  | Peterson |

(Continued)

OTHER PUBLICATIONS

Antonkakis et al., "Building a Dynamic Reputation System for DNS", Aug. 11, 2010.

(Continued)

*Primary Examiner* — Christopher C Harris
(74) *Attorney, Agent, or Firm* — Van Pelt, Yi & James LLP

(57) ABSTRACT

Techniques for malware detection using clustering with malware source information are disclosed. In some embodiments, malware detection using clustering with malware source information includes generating a first cluster of source information associated with a first malware sample, in which the first malware sample was determined to be malware, and the first malware sample was determined to be downloaded from a first source; and determining that a second source is associated with malware based on the first cluster.

12 Claims, 9 Drawing Sheets

(56) References Cited

U.S. PATENT DOCUMENTS

| | | | | |
|---|---|---|---|---|
| 8,424,091 B1* | 4/2013 | Su | ............................ | H04L 51/12 |
| | | | | 713/187 |
| 8,516,585 B2* | 8/2013 | Cao | ..................... | H04L 63/1441 |
| | | | | 713/187 |
| 8,561,193 B1* | 10/2013 | Srivastava | ............ | G06F 21/563 |
| | | | | 713/152 |
| 8,667,587 B1 | 3/2014 | Bogorad | | |
| 8,813,236 B1* | 8/2014 | Saha | ................... | H04L 63/1408 |
| | | | | 726/22 |
| 8,826,426 B1 | 9/2014 | Dubey | | |
| 2007/0006310 A1 | 1/2007 | Piccard | | |
| 2007/0016951 A1 | 1/2007 | Piccard | | |
| 2008/0133540 A1 | 6/2008 | Hubbard | | |
| 2010/0031362 A1 | 2/2010 | Himberger | | |
| 2010/0057895 A1 | 3/2010 | Huang | | |
| 2010/0125663 A1 | 5/2010 | Donovan | | |
| 2010/0138375 A1 | 6/2010 | Hanner | | |
| 2010/0235915 A1 | 9/2010 | Memon | | |
| 2010/0262693 A1 | 10/2010 | Stokes | | |
| 2011/0167495 A1 | 7/2011 | Antonakakis | | |
| 2011/0185423 A1* | 7/2011 | Sallam | ................... | G06F 21/566 |
| | | | | 726/23 |
| 2011/0252476 A1 | 10/2011 | Loveland | | |
| 2011/0283361 A1 | 11/2011 | Perdisci | | |
| 2012/0042381 A1 | 2/2012 | Antonakakis | | |
| 2012/0084860 A1 | 4/2012 | Cao | | |
| 2012/0203904 A1 | 8/2012 | Niemelä | | |
| 2012/0233694 A1* | 9/2012 | Baliga | ................... | G06F 21/568 |
| | | | | 726/23 |
| 2012/0260342 A1 | 10/2012 | Dube | | |
| 2012/0311709 A1 | 12/2012 | Kang | | |
| 2012/0323829 A1 | 12/2012 | Stokes | | |
| 2013/0036466 A1 | 2/2013 | Penta | | |
| 2013/0067579 A1 | 3/2013 | Beveridge | | |
| 2013/0174253 A1* | 7/2013 | Thomas | .............. | H04L 63/1416 |
| | | | | 726/22 |
| 2013/0326625 A1 | 12/2013 | Anderson | | |

OTHER PUBLICATIONS

Bilge et al., "Exposure: Finding Malicious Domains Using Passive DNS Analysis", NDSS 2011, 18th Annual Network and Distributed System Security Symposium, Feb. 2011,San Diego, CA.

Nvernizzi et al., "EvilSeed: A Guided Approach to Finding Malicious Web Pages", 2012.

* cited by examiner

| group ID | First Sample Date | Last Sample Date | #hostname | #session | #sample | #filename | #uri | #device | #ip | #country | #visit |
|---|---|---|---|---|---|---|---|---|---|---|---|
| 21781 | 2012-08-03 | 2012-08-08 | 9 | 12 | 1 | 1 | 7 | 4 | 6 | 4 | 23 |

FIG. 5A

| hostname | type | #update_time |
|---|---|---|
| wittdj.nylonparadies.info | 0 | 2012-08-08 06:34:29 |
| marcodewaard.nl | 0 | 2012-08-08 01:12:01 |
| fdreeve.org | 0 | 2012-08-08 00:17:46 |
| jesuspadillajr.com | 0 | 2012-08-07 18:00:33 |
| www.jesuspadillajr.com | 0 | 2012-08-07 15:20:35 |
| phippi.jes.ee | 0 | 2012-08-07 13:50:14 |
| www.barbaratorium.dk | 0 | 2012-08-06 06:37:49 |
| www.phoneandtabletapps.com | 0 | 2012-08-06 04:48:58 |
| www.wrango.se | 0 | 2012-08-03 10:54:14 |

FIG. 5B

| group ID | First Sample Date | Last Sample Date | #hostname | #session | #sample | #filename | #uri | #device | #ip | #country | #visit host |
|---|---|---|---|---|---|---|---|---|---|---|---|
| 21825 | 2012-08-07 | 2012-08-08 | 1 | 10 | 6 | 3 | 3 | 7 | 1 | 1 | 6 |

FIG. 6A

| First Seen Last Seen | hash | filename | Domain | URI | app | signer | signature | WF | VT | MS | SVM |
|---|---|---|---|---|---|---|---|---|---|---|---|
| 2012-08-08 2012-08-08 | 68bbecb2eca706469cf6612275627f33 (Wild Fire) (MultiScanner) (virustotal) | blackad.exe | 77.81.240.156 | /trash/blackad.exe | web-browsing | | Virus/Win32.WGeneric | 1 | -1 | 0 | |
| 2012-08-08 2012-08-08 | eae2a0b54aab3058a8a8babc8abb78be (Wild Fire) (MultiScanner) (virustotal) | blackad.exe | 77.81.240.156 | /trash/blackad.exe | web-browsing | | Trojan-Downloader/Win32.agent | 1 | -1 | 1 | |
| 2012-08-08 2012-08-08 | eb08d6edfce887fa27ef968b74ccb7ef (Wild Fire) (MultiScanner) (virustotal) | output.exe | 77.81.240.156 | /trash/output.exe | web-browsing | | Trojan-Spy/Win32.zbot | 1 | -1 | 1 | |
| 2012-08-08 2012-08-08 | 0eaecedd70d67abc8a0a42b7288334cb5 (Wild Fire) (MultiScanner) (virustotal) | icq.exe | 77.81.240.156 | /trash/icq.exe | web-browsing | | Trojan/Win32.yakes | 1 | -1 | 2 | |
| 2012-08-08 2012-08-08 | 46673a3791660a04c91ebc8091fc5174 (Wild Fire) (MultiScanner) (virustotal) | blackad.exe | 77.81.240.156 | /trash/blackad.exe | web-browsing | | Trojan-Downloader/Win32.agent | 1 | -1 | 1 | |
| 2012-08-07 2012-08-07 | e82ebb503d0d8fe2196e313bb672d67 (Wild Fire) (MultiScanner) (virustotal) | blackad.exe | 77.81.240.156 | /trash/blackad.exe | web-browsing | | Trojan-Downloader/Win32.agent | 1 | -1 | 2 | |

FIG. 6B

MALWARE DETECTION USING CLUSTERING WITH MALWARE SOURCE INFORMATION

CROSS REFERENCE TO OTHER APPLICATIONS

This application is a continuation of co-pending U.S. patent application Ser. No. 13/777,995, entitled MALWARE DETECTION USING CLUSTERING WITH MALWARE SOURCE INFORMATION filed Feb. 26, 2013 which is incorporated herein by reference for all purposes.

BACKGROUND OF THE INVENTION

Malware is a general term commonly used to refer to malicious software (e.g., including a variety of hostile, intrusive, and/or otherwise unwanted software). For example, malware is software used or created by attackers or hackers to disrupt computer and/or computer network operation, steal proprietary information (e.g., confidential information, such as identity, financial, and/or intellectual property related information), and/or gain access to private/proprietary computer systems and/or computer networks. Malware can be in the form of code, scripts, active content, and/or other software.

Malware includes computer viruses, worms, Trojan horses, rootkits, key loggers, spyware, adware, and/or other malicious programs. Malware typically does not refer to simply defective software, which is software that has a legitimate purpose but can include harmful bugs and/or vulnerabilities that were not corrected before release of the software. However, some malware is disguised as genuine software and can come from an official company website. For example, otherwise legitimate software can be improperly packed with additional tracking software that gathers user information without user permission.

BRIEF DESCRIPTION OF THE DRAWINGS

Various embodiments of the invention are disclosed in the following detailed description and the accompanying drawings.

FIG. 5A is a summary report for a cluster of a malware sample associated with multiple hostnames and IP addresses generated using clustering with malware source information in accordance with some embodiments.

FIG. 5B is a hostname report for a cluster of a malware sample associated with multiple hostnames and IP addresses generated using clustering with malware source information in accordance with some embodiments.

FIG. 6A is a summary report for a cluster of a single source associated with malware sample variants generated using clustering with malware source information in accordance with some embodiments.

FIG. 6B is a hostname report for a cluster of a single source associated with malware sample variants generated using clustering with malware source information in accordance with some embodiments.

DETAILED DESCRIPTION

Figure 1:
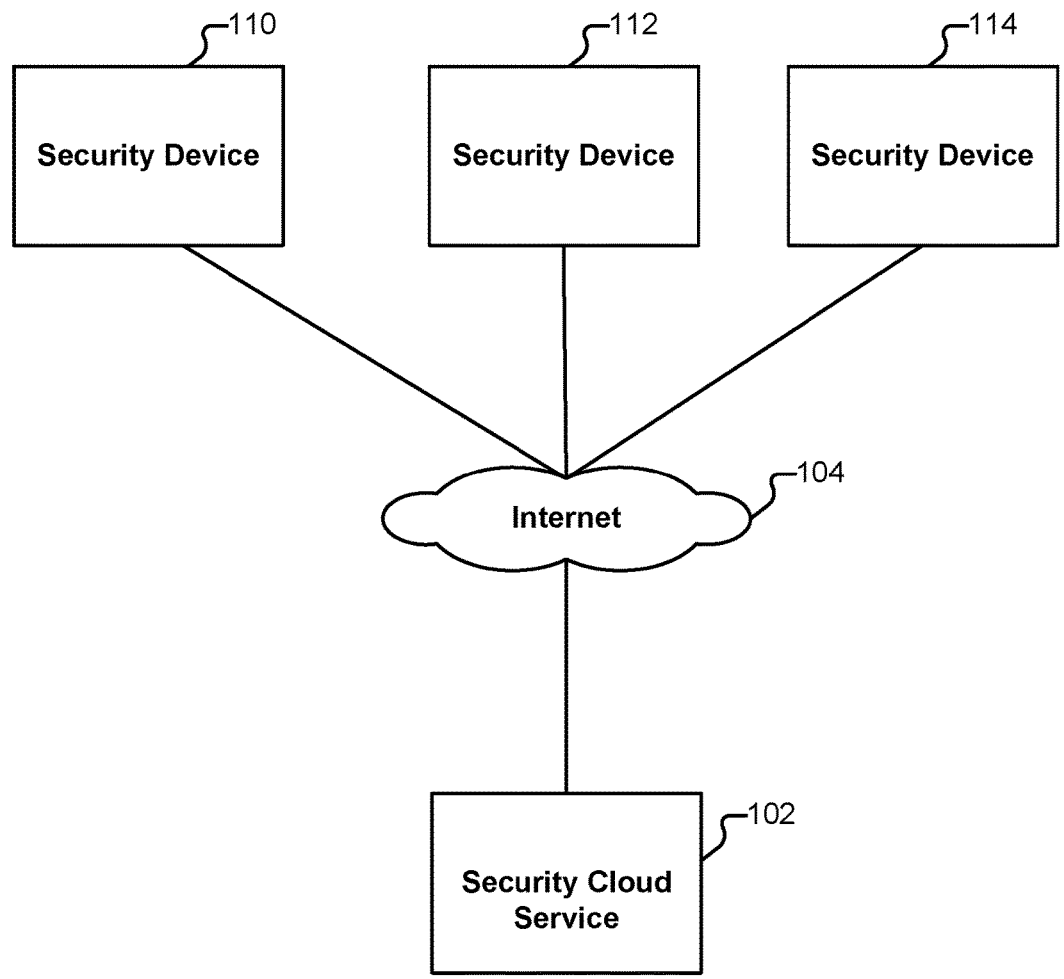
FIG. 1 is a functional block diagram illustrating malware detection using clustering with malware source information in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malware is a general term commonly used to refer to malicious software (e.g., including a variety of hostile, intrusive, and/or otherwise unwanted software). For example, malware is software used or created by attackers or hackers to disrupt computer and/or computer network operation, steal proprietary information (e.g., confidential information, such as identity, financial, and/or intellectual property related information), and/or gain access to private/proprietary computer systems and/or computer networks. Malware can be in the form of code, scripts, active content, and/or other software.

Malware includes computer viruses, worms, Trojan horses, rootkits, key loggers, spyware, adware, and/or other malicious programs. Malware typically does not refer to simply defective software, which is software that has a legitimate purpose but can include harmful bugs and/or vulnerabilities that were not corrected before release of the software. However, some malware is disguised as genuine software and can come from an official company website. For example, otherwise legitimate software can be improperly packed with additional tracking software that gathers user information without user permission.

Various types of antimalware products are commercially available that attempt to block or prevent infection of computers and/or computer networks of various types of malware. Example antimalware products include antivirus (AV) software products (e.g., host based AV software) and firewalls, such as security appliances that include firewalls (e.g., next-generation firewall solutions from Palo Alto Networks, Inc.). Such commercially available products are commonly used by personal users and/or corporate users (e.g., on their computing devices) as well as corporate networks to attempt to protect such users and/or networks from unauthorized access by other computer users and/or infection and spreading of malware on such computing devices and/or computer networks.

A variety of strategies are typically utilized by antimalware products. Signature-based detection is an antimalware technique that generally involves searching for known patterns of data within executable code (e.g., performing a static analysis of the executable file(s) to determine whether the signature can be matched based on the static analysis of the executable file(s)). Such signatures can be generated for specific malware that has been previously identified and analyzed (e.g., by a security analyst, who can determine unique features files that can be statically detected that can subsequently be used for signature-based detection of that particular malware).

It is also possible for a computer to be infected with new malware for which no signature is yet known or disseminated. To counter such so-called zero-day threats, various non-signature based techniques, such as various types of heuristic based techniques, can be used as an attempt to identify potential malware. One type of heuristic approach includes using generic signatures that can identify new viruses or variants of existing viruses by looking for known malicious code in files.

Another type of antimalware technique is sometimes referred to behavior analysis or dynamic analysis techniques. For example, dynamic analysis techniques attempt to predict what an executable file will do by running it in a sandbox (e.g., a virtual environment (VM)) and analyzing what it does within that sandbox to determine if it performs any malicious or potentially malicious actions.

However, such non-signature based approaches can fail to identify malware and/or can improperly identify legitimate software as malware (e.g., also referred to as false positives). Also, such non-signature based approaches can fail to determine if the potentially malicious software is a variant of a known malware family. For example, merely determining that a file is malware or potentially malicious using such non-signature based approaches does not identify whether that malware is a member of a particular malware family (e.g., a variant of a known malware family that is a member of such malware family).

Modern malware also often use several different types of techniques to avoid detection and hide their core functionality. For example, malware can use polymorphic packers (e.g., a polymorphic packer is a software tool that can roll up several kinds of malware into a single package, such as an e-mail attachment, and also can provide the ability to make its signature mutate over time, so it is more difficult to detect and remove using typical antimalware solutions) and/or other polymorphic or mutation related techniques (e.g., custom packers). Also, the number of different malware samples is continually increasing. Thus, providing techniques for identifying malware and/or identifying that a malware variant is part of a particular malware family presents significant challenges.

As discussed above, some antimalware approaches focus on artifacts of the actual payload of a malware sample to attempt to group malware samples together (e.g., identifying strings in the binary or structure of malicious code). However, polymorphic and custom packers hinder this effort as also discussed above. Non-signature based anti-malware techniques can sometimes detect such malware, but fail to identify whether such malware is a member of a known malware family as also discussed above.

In particular, certain malware can avoid traditional antivirus (AV) detection and firewall blocking using various approaches to evade existing anti-malware approaches. For example, malware can be distributed in diversified geo-locations, using different Internet Protocol (IP) addresses, using fast changing domain names (e.g., different web domains), varied file names, and/or different Uniform Resource Information (URI) addresses. Also, malware can be distributed using various re-packing (e.g., polymorphic packing) techniques so that such malware contain different payloads to avoid traditional AV detection approaches.

Thus, what are needed are techniques that can detect malware that use such techniques to otherwise avoid detection/blocking using existing approaches.

Accordingly, techniques for malware detection using clustering with malware source information are disclosed. For example, using various techniques for malware detection using clustering with malware source information as disclosed herein can facilitate detection of malware by identifying that such is malware by clustering with malware source information.

In some embodiments, malware detection using clustering with malware source information associates malware and malware samples based on IP, hostname/domain (e.g., web domain), URI, border gateway protocol (BGP) information, and/or various other source and related information to determine associations between malware, malware families, and various sources of such malware and malware samples, and are not limited to just a specific IP relationship between sources of malware samples.

In some embodiments, malware detection using clustering with malware source information includes generating a first cluster of source information associated with a first malware sample, in which the first malware sample was determined to be malware, and the first malware sample was determined to be downloaded from a first source; and determining that a second source is associated with malware based on the first cluster. In some embodiments, the first cluster associates related Internet Protocol (IP) address information and related domain information with the first malware sample. In some embodiments, the first cluster is generated using a searchable graph (e.g., directed graph) that associates related Internet Protocol (IP) address information and related domain information with the first malware sample.

In some embodiments, malware detection using clustering with malware source information further includes generating a graph associating a plurality of source information with the first malware sample to generate the first cluster.

In some embodiments, malware detection using clustering with malware source information further includes generating a graph associating Internet Protocol (IP) address related source information and domain (e.g., web domain) related source information with the first malware sample to generate the first cluster.

In some embodiments, malware detection using clustering with malware source information further includes generating a directed graph associating a plurality of source information with the first malware sample to generate the first cluster (e.g., indicating malware sample(s) "comes from" with direction and/or without direction, including IP resolution information to associated IP addresses with domains).

In some embodiments, malware detection using clustering with malware source information further includes determining a second malware sample is malware based on an association with the first cluster.

In some embodiments, malware detection using clustering with malware source information further includes determining a second malware sample is associated with the first cluster, in which the second malware sample is determined to come from a third source that is associated with the first cluster; and determining the second malware sample is malware based on the determination that the second malware sample comes from the third source that is associated with the first cluster.

In some embodiments, malware detection using clustering with malware source information further includes determining a domain (e.g., web domain) is associated with a malware family based on an association with the first cluster. In some embodiments, malware detection using clustering with malware source information further includes determining an Internet Protocol (IP) address is associated with a malware family based on an association with the first cluster.

In some embodiments, malware detection using clustering with malware source information further includes identifying new malware samples and, more specifically, identifying that such malware is part of a particular malware family. In particular, identifying that such malware is part of a particular malware family provides additional information to an information technology (IT), network, and/or security admin (istrator) and a security vendor (e.g., knowing a modus operandi of attackers can assist in defensive responses to an attack). For example, certain malware families can present more significant risks or threats to users and/or enterprises, such as Zeus (e.g., also known as Zbot, is a malware toolkit that allows a cybercriminal to build their own Trojan Horse, and, in particular, Zeus is a Trojan horse that can be used to steal banking information by man-in-the-browser keystroke logging and form grabbing, and was first identified in July 2007 when it was used to steal information from the United States Department of Transportation, and it became more widespread in March 2009). Thus, a security solution that can inform IT of an enterprise that one or more of their devices was infected with malware and/or attempted to download malware (e.g., Zeus is commonly delivered using drive-by-download techniques) that is a member of the Zeus malware family can provide IT with valuable information on how to respond based on the known threats and/or risks associated with the Zeus malware family (e.g., or other malware families that can pose similar or different risks or threats).

In some embodiments, malware detection using clustering with malware source information further includes detecting zero-day malware samples. For example, zero-day malware samples can include new malware and/or new variants of a known malware family for which signatures and/or rules were not previously generated for detecting such zero-day malware samples. Thus, new signatures and/or rules can then be generated for such detected zero-day malware samples using various techniques described herein. As an example, a security cloud service can then distribute new rule(s) and/or signature(s) to security software and/or security devices for detecting such new zero-day malware samples, and/or generate alerts/notifications.

FIG. 1 is a functional block diagram illustrating malware detection using clustering with malware source information in accordance with some embodiments. As shown, a security cloud service 102 is in network communication via the Internet 104 with various security devices 110, 112, and 114 (e.g., host-based or gateway/appliance/server based firewalls and/or security appliances that include firewall functionality, which can be located on the premises of one or more customers of the security cloud service). In some embodiments, the security cloud service 102 receives malware samples (e.g., potential malware) from various security devices 110, 112, and/or 114 via the Internet 104 and performs malware detection using clustering with malware source information. For example, the security cloud service can attempt to determine one or more relationships and, in particular, correlations between the received malware samples with malware source information using various techniques described herein.

For example, the security cloud service can provide for integration of such inline firewalls with the cloud by making use of a customer's on-premises firewalls in conjunction with a cloud-based security analysis engine that can deliver both protection and performance. The inline firewall on one or more customer premises can capture unknown files and can perform inline enforcement (e.g., using signature detection and/or other techniques locally on the security device) while maintaining high network throughput and low latency. The analysis of unknown files, sometimes referred to herein as malware samples, can then be offloaded to the security cloud service that provides a secure cloud-based engine to identify unknown malware and subsequently deliver protections to all locations of the security cloud service. The customer's on-premises firewalls can be configured to securely communicate with the security cloud service (e.g., using secure communication protocols, such as SSL, VPNs, and/or using other secure communication techniques). An example security cloud service includes the Wildfire® security cloud service provided by Palo Alto Networks.

For example, when an inline firewall encounters an unknown file, the file can be submitted to the security cloud service along with various associated/source information, such as download hostname, download URI/URL, download application, download IP/port, victim's IP/port, firewall IP, geo-location information, and/or various other malware source information. Such submissions of the potential malware samples can be provided manually or automatically based on a security policy configured for each security device and/or customer. In particular, the security cloud service can utilize the received malware sample(s) and associated/source information to perform malware detection using clustering with malware source information as further described herein.

In some embodiments, malware detection using clustering with malware source information includes using a security cloud service that collects and/or receives malware samples (e.g., globally from various customers using AV, firewall, and/or other security software and/or security devices (e.g., an integrated security appliance that includes firewall functionality and/or IPS/IDS functionality, and/or a security gateway that includes firewall functionality and/or IPS/IDS functionality). An example security cloud service includes the Wildfire® security cloud service provided by Palo Alto Networks. For example, such malware samples can include various information associated with each of the malware samples, such as a download hostname, download URI/URL, download application, download IP/port, victim's IP/port, firewall IP, and/or geo-location information. The security cloud service can use such information to generate a graph to then generate clusters to determine relationships (e.g., correlations) based on such information as further described herein with respect to various embodiments. In some embodiments, the security cloud service implements clustering algorithms using a clustering engine to identify such correlations as further described herein. In some embodiments, the security cloud service updates the clustering periodically (e.g., hourly, daily, and/or based on another time or event based trigger) with new sample/domain feed (e.g., uploaded or retrieved malware sample and associated information from various customers and/or security devices).

In particular, using such techniques can reveal interesting correlations among malware samples, download domains/IPs, and visiting domains/IPs. For example, using such techniques can reveal that the same malware samples (e.g., malware samples that have the same hash value, using an MD5 hash or another hashing algorithm) can come from different hostnames/IPs and/or geo-locations, and the same malware samples can also have different download URIs and filenames. As another example, different malware samples can come from the same hostname/IP and have similar malicious behaviors. As yet another example, different malware samples can visit the same hostname/IPs (e.g., visiting hostname/IP, referring to those hostname/IPs that the malware sample attempts to communicate with, such as to send information thereto and/or receive information therefrom). Thus, as disclosed herein, malware detection using clustering with malware source information provides for malware sample clustering that can associate various information associated with malware samples (e.g., domain, IP, hostname, geo-location, source—comes from information, destination—communicates/connects to information, and/or various other associations, relationships, or other information) to reveal correlations that can be used to identify new sources of malware (e.g., to identify new domains/IPs that are associated with delivering malware), verify that particular malware samples are malware (e.g., to detect new malware), and/or determine malware samples to be associated with certain malware families (e.g., to detect new variants of particular malware families). Thus, as disclosed herein, a clustering framework can be used to detect malware even when the malware samples are distributed (e.g., from different domains, IPs, and/or geo-locations), polymorphic, zero-day threats (e.g., new malware that was previously undetected), and/or using various detection avoidance techniques that would otherwise evade traditional AV detection and/or firewall blocking approaches.

In some embodiments, malware detection using clustering with malware source information includes clustering malware samples based on one or more of the following relationships or associations: (1) malware sample—source domain/IP; (2) malware sample—visiting domain/IP; and (3) source domain—hosting malware samples. In some embodiments, malware detection using clustering with malware source information includes generating a cluster of malware samples that identifies new malicious hostnames/IPs from known malware samples related information. In some embodiments, malware detection using clustering with malware source information includes generating a cluster of malware samples that identifies new malware samples from previous domain/malware sample interaction(s), without requiring use of AV engine detection or behavior analysis techniques. For example, these techniques can be used to detect and block zero-day malware samples, and the security cloud service can then distribute new rule(s) and/or signature(s) to security software and/or security devices for detecting such new zero-day malware samples.

Figure 2:
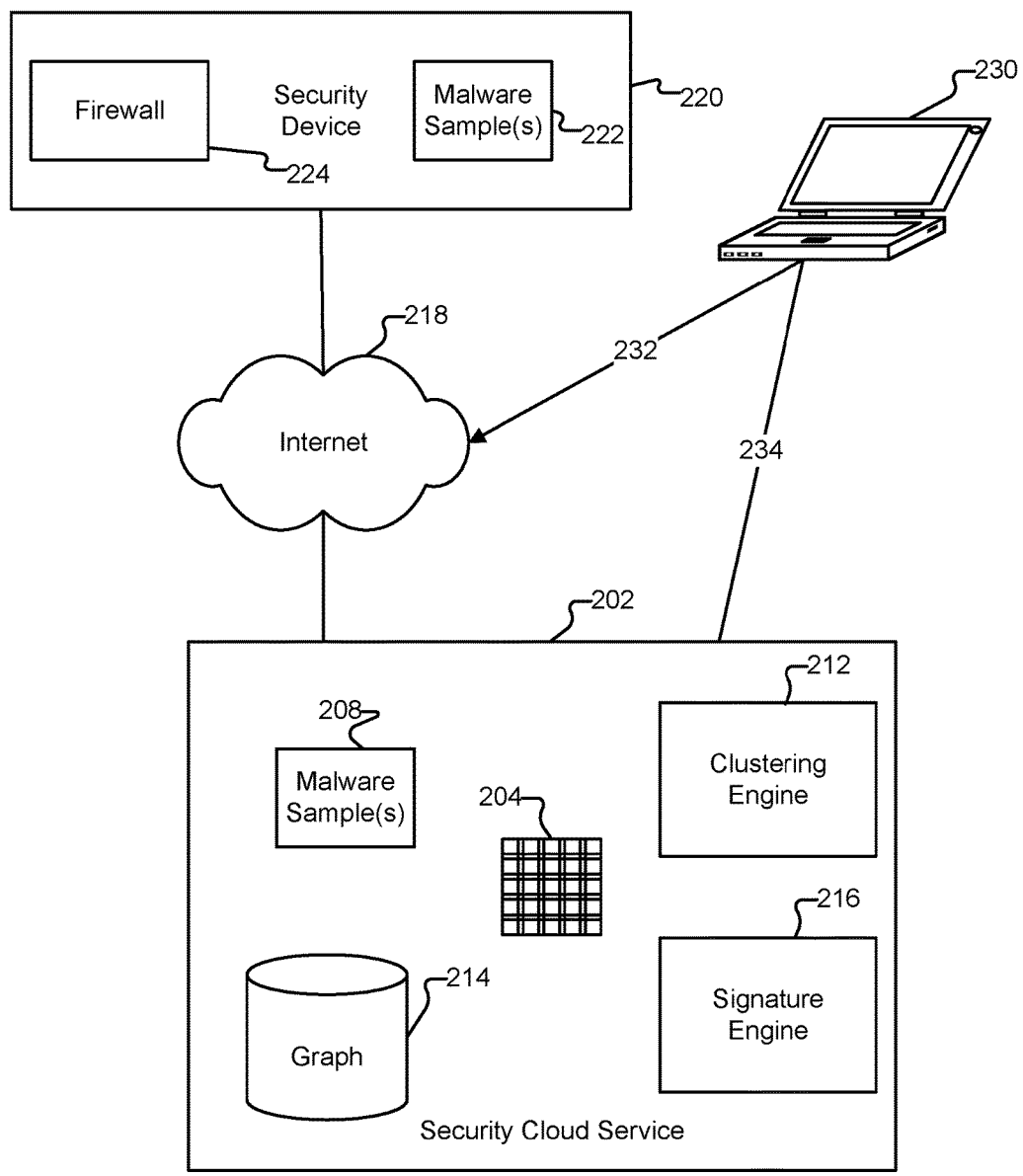
FIG. 2 is another functional block diagram illustrating malware detection using clustering with malware source information in accordance with some embodiments.

FIG. 2 is another functional block diagram illustrating malware detection using clustering with malware source information in accordance with some embodiments. As shown, a security cloud service 202 is in communication with one or more security devices, including security device 220, via the Internet 218. The security device 220 includes a firewall 224 (e.g., an inline firewall) and potential malware samples 222. For example, the potential malware samples 222 can include potential malware samples that the security device 220 could not determine whether such are malware and/or the malware family associated with such samples. As similarly discussed above, such potential malware samples 222 can be sent to the security cloud service 202 for further analysis. In some embodiments, the security cloud service can also include known malware samples and associated source information to populate or seed a graph and periodically update a graph to facilitate correlations between malware samples/variants and source information as further described herein. As also shown, the security cloud service includes a processor(s) 204, malware samples 208 received from various security devices including security device 220, a clustering engine 212, graph 214 (e.g., for graphing malware samples with malware source information using various techniques described herein), and a signature engine 216 (e.g., for automatically generating new signatures/rules for newly detected malware, such as zero-day malware threats). As further described herein with respect to various embodiments, the security cloud service 202 performs malware detection using clustering with malware source information. For example, the security cloud service can attempt to determine one or more relationships between the received malware samples with malware source information using various techniques described herein.

As also shown, an IT/security admin can use a computing device 230 (e.g., desktop computer, workstation, laptop, tablet, smart phone, and/or other computing device) to communicate with the security cloud service 202 via a communication 232 through the Internet 218 or through a local communication 234. For example, an IT/security admin can use a computing device 230 to send a potential malware sample for further analysis to the security cloud service 202. As another example, an IT/security admin can use computing device 230 to access the graph data 214 stored (e.g., in a data store, such as a database) on the security cloud service 202.

Figure 3:
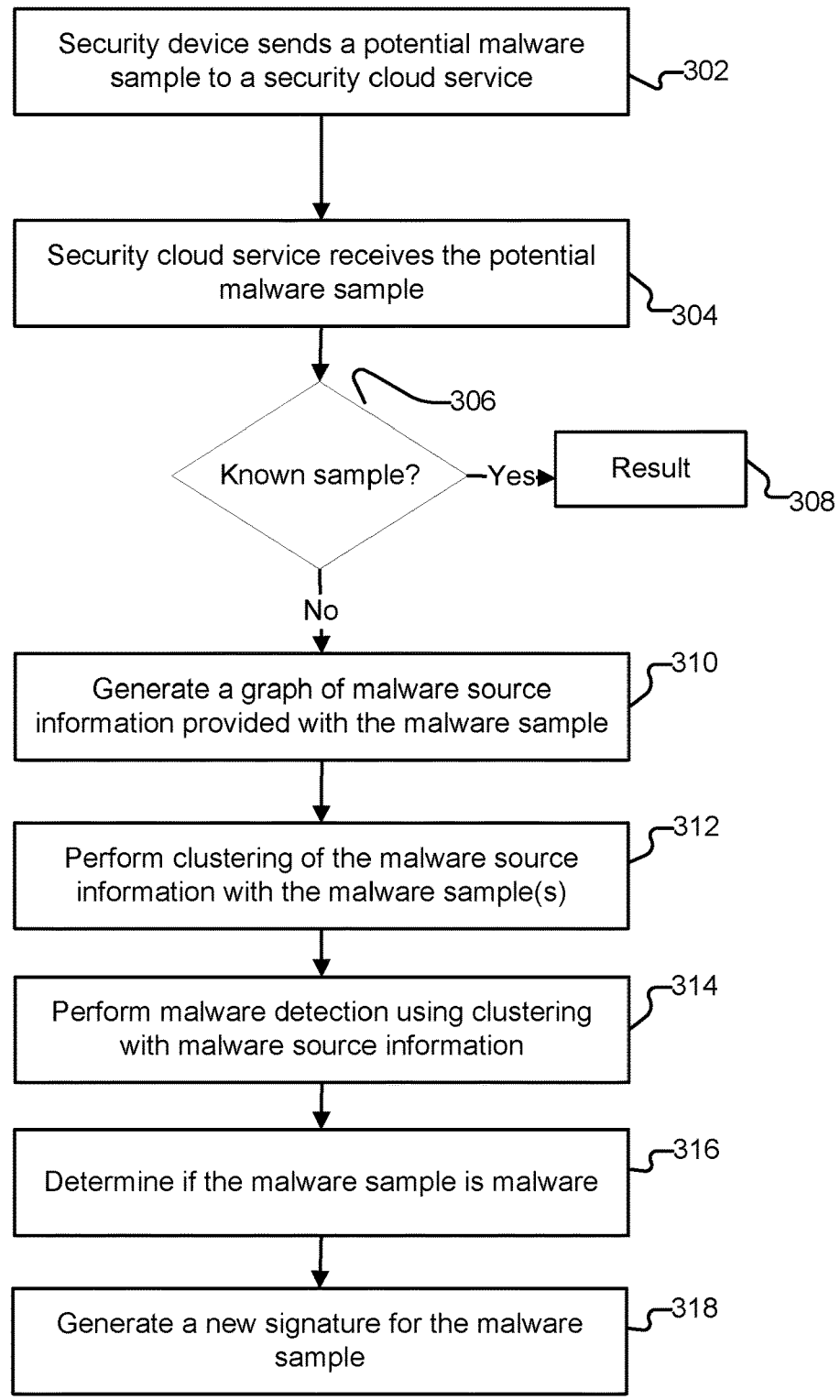
FIG. 3 is a flow diagram illustrating malware detection using clustering with malware source information in accordance with some embodiments.

FIG. 3 is a flow diagram illustrating malware detection using clustering with malware source information in accordance with some embodiments. At 302, a security device sends a potential malware sample to a security cloud service. At 304, the security cloud service receives the potential malware sample. Whether the potential malware sample is a known sample (e.g., has been previously analyzed and results of that prior analysis have been cached or stored by the security cloud service) is determined at 306. For example, files can be matched by various comparison techniques (e.g., using hashes, such as an MD5 based hash or other hashing or file comparison techniques). If the potential malware sample was already/previously analyzed by the security cloud service, then the previously determined result is provided at 308. Otherwise, processing proceeds to 310 to generate a graph of malware source information provided with the malware sample. At 312, clustering of the malware source information with the malware sample(s) is performed using a clustering engine. At 314, malware detection using clustering with malware source information is performed. At 316, whether the malware sample is malware is determined (e.g., using clustering with malware source information in accordance with various techniques described herein). In some embodiments, new sources (e.g., hostnames, IPs, and/or domains) of malware can also be determined using clustering with malware source information in accordance with various techniques described herein. In some embodiments, new visiting entities (e.g., hostnames, IPs, and/or domains) of malware can also be determined using clustering with malware source information in accordance with various techniques described herein. At 318, a new signature and/or rule is automatically generated if the malware sample was determined to be new malware (e.g., zero-day threat or previously undetected malware for which a signature/rule does not already exist for detecting that particular malware, which can be a new type of malware or a new variant of a known malware family). In some embodiments, the results for the potential malware sample are cached or stored by the security cloud service (e.g., to avoid having to repeat the analysis of a later submission of an identical malware sample from another security device and to maintain a collection of known, previously analyzed malware samples).

Figure 4:
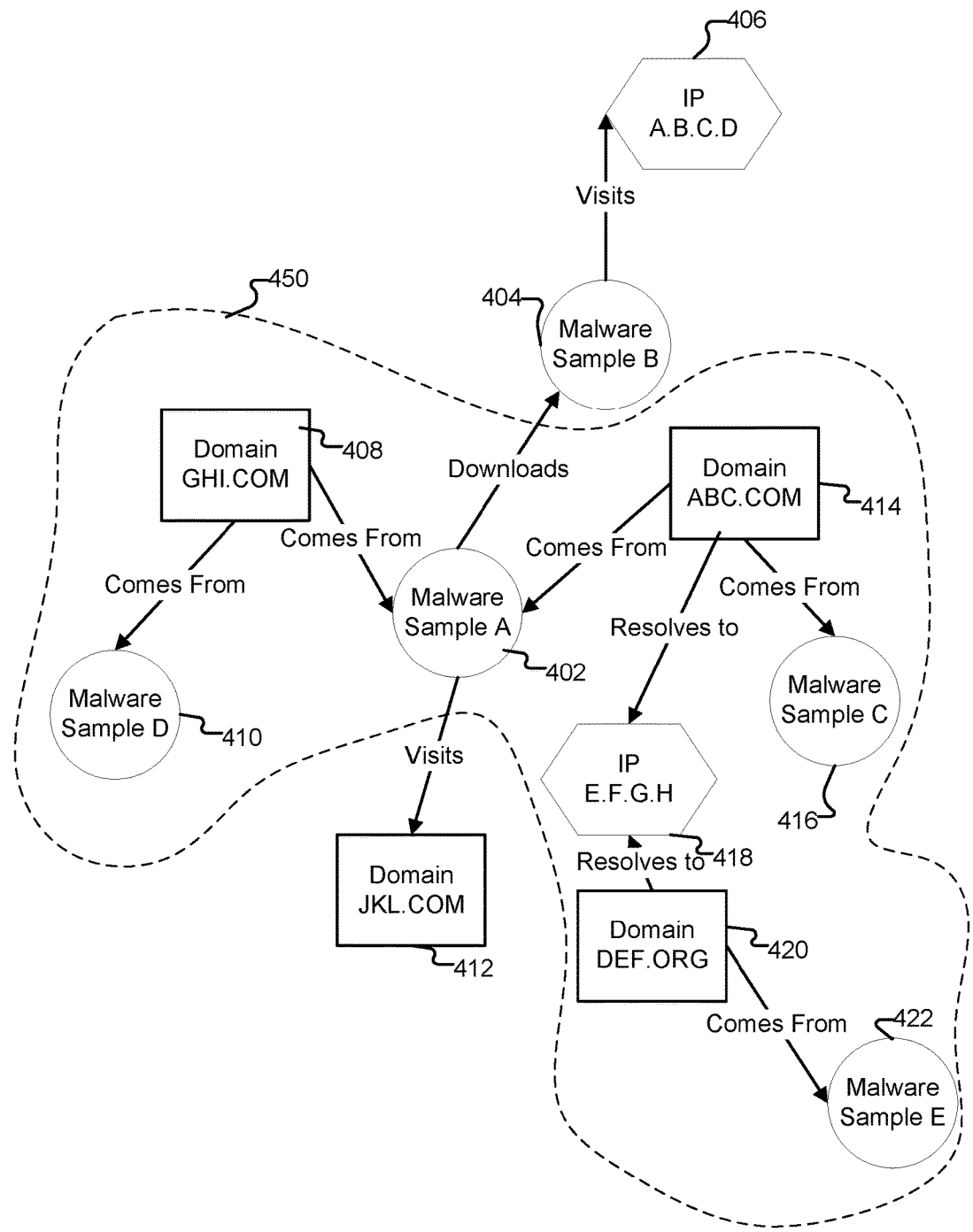
FIG. 4 is a directed graph diagram illustrating malware detection using clustering with malware source information in accordance with some embodiments.

FIG. 4 is a directed graph diagram illustrating malware detection using clustering with malware source information in accordance with some embodiments. In some embodiments, malware detection using clustering with malware source information includes identifying malware, IP addresses associated with malware (e.g., malware IP), domains (e.g., web domains) associated with malware (e.g. malware domains), new malware variants associated with a known malware family, and/or botnets using a graph (e.g., a directed graph) to generate malware clusters as described herein with respect to various embodiments. For example, malware, malware IPs, and malware domains that come from the same botnet or same entities can be determined to be related. In particular, these relationships can be used to identify new malware, malware domains and malware IPs. As an example, a domain can be determined to be a malware domain if it serves malware, a malware sample (e.g., an executable file) can be determined to be malware if it comes from a malware domain, an IP address can be determined to be a malware IP if a malware domain resolves to that IP address, and so forth based on such relationships that can be determined based on clustering generated using a graph (e.g., a directed graph) as described herein with respect to various embodiments. Using such techniques, more malware samples, malware IPs, and malware domains can be identified through such graph and clustering techniques.

In some embodiments, malware detection using clustering with malware source information includes generating a directed graph to identify malware clusters as described herein with respect to various embodiments. In some embodiments, malware samples, domains, and IP addresses (IPs) are represented as nodes in the directed graph, and edges represent relationships or associations between the nodes. Through graph traverse techniques, new malware, malware domains, malware IPs, and malware family relationships can be determined as further described herein with respect to various embodiments. For example, open source graph traversal libraries from Apple and/or other graph traversal packages can be used to implement the graph traversal techniques described herein. Also, malware samples, malware domains, and malware IPs can similarly be clustered for the same botnet (e.g., or gang) using the various techniques described herein with respect to various embodiments.

Referring to FIG. 4, a directed graph is generated based on various malware samples and associated malware source information. As shown, a malware sample A 402 downloads malware sample B 404. Malware sample B 404 visits IP address A.B.C.D 406. Malware sample A 402 comes from domain GHI.COM 408. Malware sample D 410 comes from domain GHI.COM 408. Malware sample A 402 visits domain JKL.COM 412. Malware sample A 402 also comes from domain ABC.COM 414. Malware sample C 416 comes from domain ABC.COM 414. Domain ABC.COM 414 resolves to IP E.F.G.H 418. Domain DEF.ORG 420 also resolves to IP E.F.G.H 418. Malware sample E 422 comes from domain DEF.ORG 420. As shown, a cluster 450 includes malware samples, malware domains, and malware IPs that are determined to be associated using various techniques described herein. In this example, domain GHI.COM 408 can be assumed to be a known malware domain such that using this information regarding malware domain GHI.COM 408, cluster 450 can be generated to identify new malware, new malware domains, and new malware IPs based on comes from, and resolves to relationships as shown in which correlations between malware samples with domains and IPs can be determined.

As similarly discussed above, certain malware samples, which have the same hash value, can come from different hostnames, different IPs, and different geo-locations. Also, certain malware samples can have different download URIs and/or filenames. In some cases, different malware samples can come from the same domain (e.g., hostname/web domain), same IP, and such malware samples can have similar malicious behaviors (e.g., detected using behavioral analysis or similar techniques). Based on various associations or relationships, a malware sample/domain/IP clustering framework is implemented to perform malware detection using clustering with malware source information. In some embodiments, the framework clusters or groups domains, IPs, and samples; discovers the correlations among malware domains and IPs; determines new malware domains and IPs from previous sample information; determines new malware samples from previous domain/sample interaction(s), and such can be provided without requiring AV engine detection or behavior analysis; and help to identify new malware samples.

FIG. 5A is a summary report for a cluster of a malware sample associated with multiple hostnames and IP addresses generated using clustering with malware source information in accordance with some embodiments. As shown, the summary report is for a cluster for the same malware sample (e.g., a sample with a particular MD5 hash, such as 0ebc4bf0a5e172aa293214deb49d7cb0) that is associated with diversified/different domains and IPs. In particular, this malware sample was determined to be associated with 9 different hostnames (e.g., domains or web domains), 7 different URIs, 6 different IP addresses and 4 different countries.

FIG. 5B is a hostname report for a cluster of a malware sample associated with multiple hostnames and IP addresses generated using clustering with malware source information in accordance with some embodiments. As shown in the hostname report, the malware sample was first received on Aug. 3, 2012 from www.wrango.so and was subsequently received from various different hostnames. For example, assuming that the malware sample is determined or known to be malware, then domains that were previously not known to be associated with malware (e.g., malware domains) can be determined when such a new domain is associated with downloading this malware sample (e.g., a new domain wittdj.nylonparadies.info that provides the malware sample can be determined to be a malware domain even if it is the first time that this domain has been observed by the cloud security service).

FIG. 6A is a summary report for a cluster of a single source associated with malware sample variants generated using clustering with malware source information in accordance with some embodiments. FIG. 6B is a malware sample variants report for a cluster of a single source associated with malware sample variants generated using clustering with malware source information in accordance with some embodiments. As shown in FIG. 6B, the summary report is for a cluster of a single source (e.g., host 77.81.240.156) that is provides six malware sample variants (e.g., with different hash values, filenames, URIs, etc.). In particular, when an AV engine and/or behavior blocking engine scans such malware sample variants, the result can be different virus names are detected/identified and/or such may not even be able to detect that such is malware (e.g., 68bbecb2eca706469cf6612275627f33 may not be detectable using such existing AV and/or behavior blocking techniques as it is a new variant that was not previously detected and/or exhibits new behaviors that evade detection). However, from the sample/domain correlation, the new malware sample variant can be determined to be malware and these six malware variants can be determined to belong to the same malware family (e.g., a variant of the Zbot family, or, in some cases, another malware family) using the various techniques described herein with respect to various embodiments.

In some embodiments, malware detection using clustering with malware source information includes performing a clustering algorithm (e.g., using a clustering engine) to discover sample/domain correlations. In some embodiments, the clustering algorithm includes a recursive algorithm to find all the samples and domains from a database (e.g., graph data stored in a database) that are correlated. An example pseudo code algorithm is reproduced below.

```
For hostname in host_pool:
    call cluster(hostname, cluster_id)
    cluster_id++
Function cluster(host_A, cluster_id)
{
    Add host_A to cluster[cluster_id]
    Remove host_A from host_pool
    Sample_List = Find all samples from host_A in Database
    For Sample_S in Sample_List:
        Add Sample_S to cluster[cluster_id]
        Host_List = Find all hostnames provide Sample_S in Database
        For Host_B in Host_List:
            Call cluster(Host_B, cluster_id)
}
```

Figure 7:
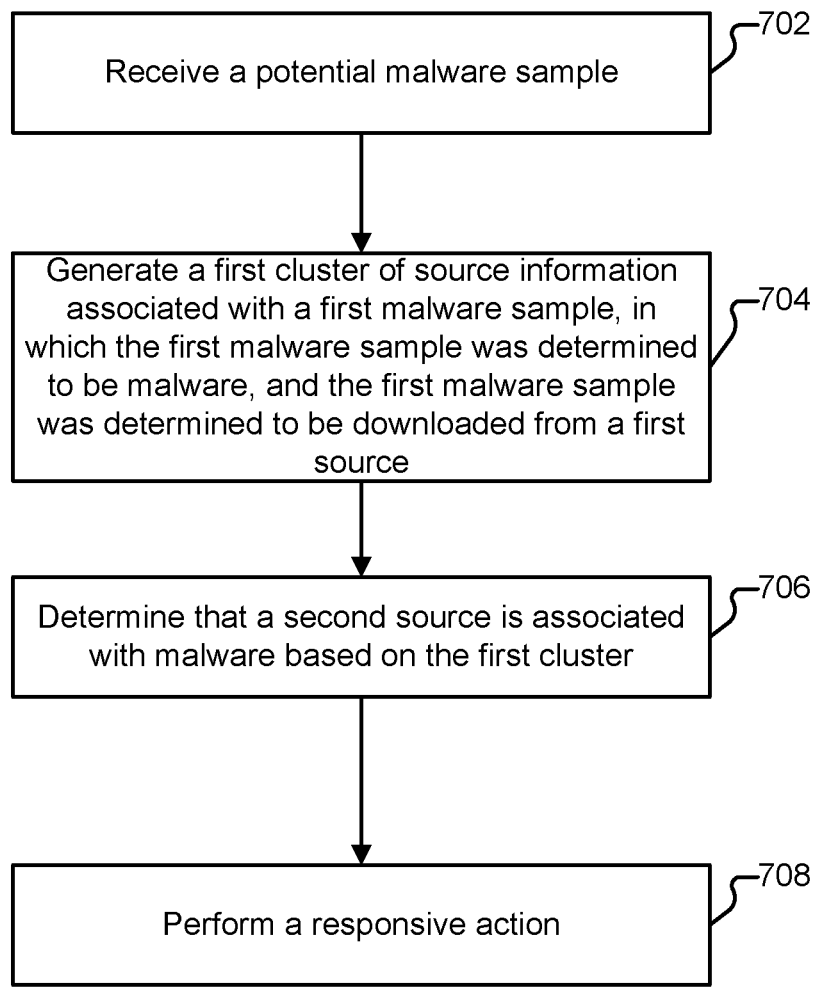
FIG. 7 is another flow diagram illustrating malware detection using clustering with malware source information in accordance with some embodiments.

FIG. 7 is another flow diagram illustrating malware detection using clustering with malware source information in accordance with some embodiments. At 702, a potential malware sample is received (e.g., at a security cloud service). At 704, generating a first cluster of source information associated with a first malware sample is performed (e.g., generating a cluster in a graph, such as a directed graph, using various techniques described herein), in which the first malware sample was determined to be malware, and the first malware sample was determined to be downloaded from a first source. At 706, determining that a second source is associated with malware based on the first cluster is performed. At 708, a responsive action is performed (e.g., a new signature can be generated for new malware, and/or an alert and/or notification to a security vendor, IT/security admin, user, and/or other person or entity associated with the submitted potential malware sample can be generated if new malware was detected, a new malware source was identified, and/or a new malware visited entity was identified, and/or other relationships or new malware related information was identified).

Figure 8:
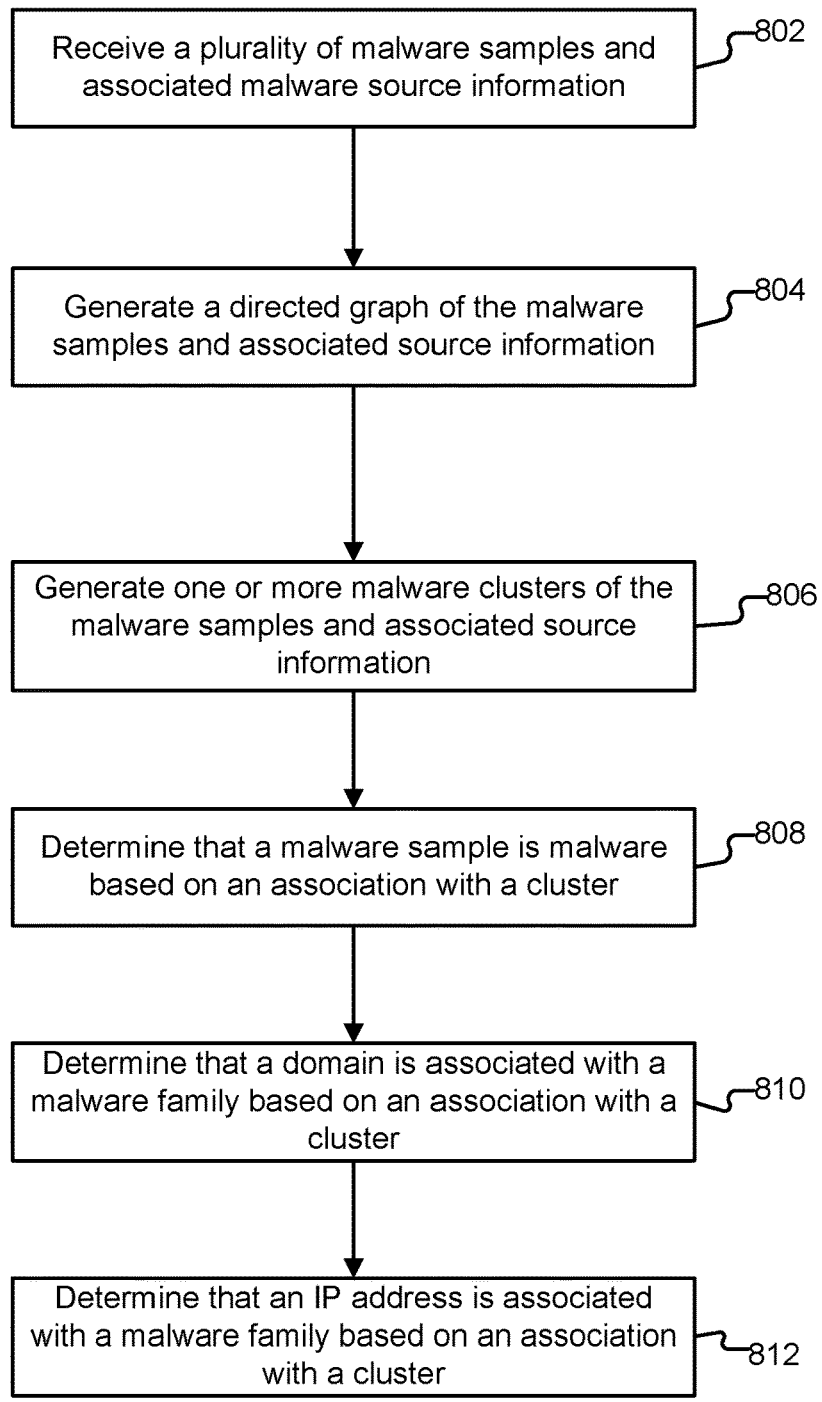
FIG. 8 is another flow diagram illustrating malware detection using clustering with malware source information in accordance with some embodiments.

FIG. 8 is another flow diagram illustrating malware detection using clustering with malware source information in accordance with some embodiments. At 802, a plurality of malware samples and associated malware source information are received (e.g., at a security cloud service). At 804, generating a directed graph of the malware samples and associated source information is performed using various techniques described herein. At 806, generating one or more malware clusters of the malware samples and associated source information is performed using various techniques described herein. At 808, determining that a malware sample is malware based on an association with a cluster is performed. At 810, determining that a domain (e.g., a web domain) is associated with malware based on an association with a cluster is performed. At 812, determining that an IP address is associated with malware based on an association with a cluster is performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a processor configured to:
generate a graph including a plurality of source information associated with a plurality of known malware samples, the plurality of known malware samples being determined to be malicious, the plurality of source information including a download hostname, a download Uniform Resource Identifier (URI), a download Uniform Resource locator (URL), a download application, a download Internet Protocol (IP) address and port, a victim's IP address and port, a firewall IP address, geo-location information, or any combination thereof, the graph including a set of nodes and a set of edges, each node of the set of nodes representing a source domain name, a source IP address, or a combination thereof, each edge of the set of edges representing a relationship between two nodes of the set of nodes;
generate clusters representing the set of nodes based at least in part on a clustering algorithm, the set of nodes representing the plurality of known malware samples and the plurality of source information, the clustering algorithm including a recursive algorithm to identify malware samples and source information that are correlated;
receive a first malware sample for analysis, wherein the first malware sample was downloaded from a first source;
insert a first node and a second node into the graph, the first node representing the first malware sample, the second node representing the first source;
determine, based on a traversal of the graph, that the first source is associated with malware, wherein an edge related to the first source is connected to at least one cluster;

determine that the first malware sample is malicious in response to a determination that the first source is associated with the at least one cluster;
extract a first signature from the first malware sample;
store the extracted first signature in a database located on a security device; and
detecting the malware based on the first signature; and
a memory coupled to the processor and configured to provide the processor with instructions.

2. The system recited in claim 1, wherein a first cluster is generated using a searchable graph that associates related Internet Protocol (IP) address information and related domain name information with the first malware sample.

3. The system recited in claim 1, wherein the processor is further configured to:
generate a directed graph associating the plurality of source information with the first malware sample to generate a first cluster.

4. The system recited in claim 1, wherein a second malware sample is determined to be malware based on a determination that the second malware sample comes from a source that is associated with a first cluster.

5. The system recited in claim 1, wherein the processor is further configured to:
determine a domain name is associated with a malware family based on an association with a first cluster.

6. The system recited in claim 1, wherein the processor is further configured to:
determine an Internet Protocol (IP) address is associated with a malware family based on an association with a first cluster.

7. A method, comprising:
generating a graph including a plurality of source information associated with a plurality of known malware samples, the plurality of known malware samples being determined to be malicious, the plurality of source information including a download hostname, a download Uniform Resource Identifier (URI), a download Uniform Resource locator (URL), a download application, a download Internet Protocol (IP) address and port, a victim's IP address and port, a firewall IP address, geo-location information, or any combination thereof, the graph including a set of nodes and a set of edges, each node of the set of nodes representing a source domain name, a source IP address, or a combination thereof, each edge of the set of edges representing a relationship between two nodes of the set of nodes;
generating clusters representing the set of nodes based at least in part on a clustering algorithm, the set of nodes representing the plurality of known malware samples and the plurality of source information, the clustering algorithm including a recursive algorithm to identify malware samples and source information that are correlated;
receiving a first malware sample for analysis, wherein the first malware sample was downloaded from a first source;
inserting a first node and a second node into the graph, the first node representing the first malware sample, the second node representing the first source;
determining, based on a traversal of the graph, that the first source is associated with malware, wherein an edge related to the first source is connected to at least one cluster;
determining that the first malware sample is malicious in response to a determination that the first source is associated with the at least one cluster;
extracting a first signature from the first malware sample;
storing the extracted first signature in a database located on a security device; and
detecting the malware based on the first signature.

8. The method of claim 7, further comprising:
generating a directed graph associating the plurality of source information with the first malware sample to generate a first cluster.

9. The method of claim 7, further comprising:
determining a domain name or an Internet Protocol (IP) address is associated with a malware family based on an association with a first cluster.

10. A computer program product, the computer program product being embodied in a tangible non-transitory computer readable storage medium and comprising computer instructions for:
generating a graph including a plurality of source information associated with a plurality of known malware samples, the plurality of known malware samples being determined to be malicious, the plurality of source information including a download hostname, a download Uniform Resource Identifier (URI), a download Uniform Resource locator (URL), a download application, a download Internet Protocol (IP) address and port, a victim's IP address and port, a firewall IP address, geo-location information, or any combination thereof, the graph including a set of nodes and a set of edges, each node of the set of nodes representing a source domain name, a source IP address, or a combination thereof, each edge of the set of edges representing a relationship between two nodes of the set of nodes;
generating clusters representing the set of nodes based at least in part on a clustering algorithm, the set of nodes representing the plurality of known malware samples and the plurality of source information, the clustering algorithm including a recursive algorithm to identify malware samples and source information that are correlated;
receiving a first malware sample for analysis, wherein the first malware sample was downloaded from a first source;
inserting a first node and a second node into the graph, the first node representing the first malware sample, the second node representing the first source;
determining, based on a traversal of the graph, that the first source is associated with malware, wherein an edge related to the first source is connected to at least one cluster;
determining that the first malware sample is malicious in response to a determination that the first source is associated with the at least one cluster;
extracting a first signature from the first malware sample;
storing the extracted first signature in a database located on a security device; and
detecting the malware based on the first signature.

11. The computer program product recited in claim 10, further comprising computer instructions for:
generating a directed graph associating a plurality of source information with the first malware sample to generate a first cluster.

12. The computer program product recited in claim 10, further comprising computer instructions for:

determining a domain name or an Internet Protocol (IP) address is associated with a malware family based on an association with a first cluster.

* * * * *